United States Patent
Nilsen et al.

(10) Patent No.: US 7,717,015 B2
(45) Date of Patent: May 18, 2010

(54) BRICK TIE ANCHOR AND DRIVE TOOL

(75) Inventors: Martin J. Nilsen, Hampshire, IL (US); Michael E. Ward, Geneva, IL (US); Michael C. Dill, Elk Grove Village, IL (US); Yongping Gong, Glenview, IL (US)

(73) Assignee: Illinois Tool Works Inc., Gelnview, IL (US)

( * ) Notice: Subject to any disclaimer, the term of this patent is extended or adjusted under 35 U.S.C. 154(b) by 20 days.

(21) Appl. No.: 11/756,840

(22) Filed: Jun. 1, 2007

(65) Prior Publication Data
US 2008/0295651 A1   Dec. 4, 2008

(51) Int. Cl.
*B25B 13/48*   (2006.01)
*F16B 23/00*   (2006.01)
*F16B 45/00*   (2006.01)

(52) U.S. Cl. ............... 81/176.2; 411/396; 411/400; 81/124.2

(58) Field of Classification Search ............... 411/371.1, 411/337, 375, 396, 400, 401, 387.2, 542; 248/304; 81/176.2, 121.1, 124.2, 180.1
See application file for complete search history.

(56) References Cited

U.S. PATENT DOCUMENTS

| | | | | |
|---|---|---|---|---|
| 1,188,305 A * | 6/1916 | Noerteman | ............ | 411/396 |
| 3,803,972 A * | 4/1974 | Deutsher | ............ | 411/337 |
| 4,473,984 A * | 10/1984 | Lopez | ............ | 411/400 |
| 4,596,102 A | 6/1986 | Catani | | |
| 4,764,069 A | 8/1988 | Reinwall | | |
| 4,958,970 A * | 9/1990 | Rose et al. | ............ | 411/12 |
| 5,156,509 A * | 10/1992 | Wu | ............ | 411/542 |
| 5,338,141 A * | 8/1994 | Hulsey | ............ | 411/375 |
| 5,516,248 A * | 5/1996 | DeHaitre | ............ | 411/387.2 |
| 6,109,850 A * | 8/2000 | Commins | ............ | 411/387.2 |
| 2001/0009638 A1 | 7/2001 | Crawford | | |

FOREIGN PATENT DOCUMENTS

| | | |
|---|---|---|
| DE | 20 2006 016678 | 12/2006 |
| EP | 0441793 B1 | 5/1996 |
| GB | 1 176 763 | 1/1970 |
| GB | 2298889 A | 9/1996 |

OTHER PUBLICATIONS

International Search Report for PCT/US2008/063592.

* cited by examiner

*Primary Examiner*—Hadi Shakeri
(74) *Attorney, Agent, or Firm*—Levenfeld Pearlstein, LLC

(57) ABSTRACT

A brick tie anchor secures a brick veneer to an underlying structure. The anchor includes a head portion having a shaped body defining a longitudinal axis. The head includes a key portion extending from an end of the body having generally flat sides and an open central area. A shank has an upper shank portion and a lower shank portion. The lower shank portion is threaded for penetration into the underlying structure. The upper shank portion and the lower shank portion are separated from one another by a shoulder. The upper shank portion includes a knurled region extending from the shoulder. A washer is disposed at the juncture of the head portion and the shank. The washer has a diameter greater than a largest measurement across the head portion. The washer includes a resilient sealing element on the side of the washer adjacent to the shank. A driving tool for the anchor is also disclosed.

5 Claims, 3 Drawing Sheets

BRICK TIE ANCHOR AND DRIVE TOOL

BACKGROUND OF THE INVENTION

The present invention relates generally to anchors. More particularly, the present invention relates to a new and improved anchor for anchoring brick to an underlying structure.

Brick is popular as a veneer for buildings and other structure. Many such structures have light gauge steel frame walls, (other) masonry walls and structural steel framing. In light gauge steel framing, typically, the framing is erected, and a gypsum sheathing is attached to the framing. An additional layer of rigid foam can be attached to the gypsum to provide further insulation. A vapor barrier, typically in the form of a thin plastic sheet, is applied over the entire wall assembly.

The brick veneer or facade is applied over the wall assembly. The brick can be positioned (stacked) about 1 inch away from the vapor barrier. A metal tie is used to secure the brick veneer to the steel framing of the wall structure. In present applications a brick tie that is about 5 to 6 inches long (with 2 holes at each end) is fastened over the wall assembly into the steel framing using fasteners, such as self-drilling screws. The straps are located approximately every 5 courses of brick at each steel stud, generally 16 to 24 inches on center. As additional courses of brick are erected additional metal wire loops are fed through the strap, centered on the brick and embedded into the mortar.

Other known ties are used having self-drilling fasteners threaded into a zinc alloyed die-cast head. The head has a slotted opening to receive the metal wire loop. This type of arrangement eliminates one fastener, resulting in reduced labor time and cost compared to the two anchor method.

Accordingly, there is a need for a brick tie anchor that permits securing brick veneer to an underlying structure. Desirably, such an anchor is readily installed in the structure. More desirably, such an anchor readily penetrates the vapor barrier, insulation and gypsum without unduly crushing these materials. Most desirably, such an anchor provides a seal at the vapor barrier so as to maintain a seal at that barrier.

BRIEF SUMMARY OF THE INVENTION

A brick tie anchor is used to secure a brick veneer to an underlying structure. The anchor includes a head portion having a shaped body that defines a longitudinal axis. In a present anchor, the body has a short cylindrical shape.

The head portion includes a key portion extending from an end of the body. The key portion has generally flat sides and an open central area.

A shank has an upper shank portion and a lower shank portion. The lower portion is threaded for penetration into the underlying structure. The upper shank portion and the lower shank portion are separated from one another by a shoulder. The upper shank portion includes a knurled region extending from the shoulder.

A sealing washer is disposed at a juncture of the head portion and the shank. The washer has a diameter greater than a largest measurement across the head portion. Preferably, the washer has a resilient element on the side of the washer adjacent to the shank. The head portion can be joined to the shank by a crimp.

In a present anchor, the shank has a penetrating tip. The penetrating tip can be a self-drilling tip.

The knurled region can extend a portion, an perhaps the entirety of the length of the upper shank portion. The knurled region can define an effective periphery equal to or greater than a periphery area of the non-knurled region of the upper shank portion.

A driving tool for the anchor includes a body having a recess therein and a slotted opening in the body contiguous with the recess. The anchor head fits into the recess such that the body resides within the recess and the key portion resides within the slotted opening. The tool can be configured as a socket for attachment to, for example, an electric driving tool (such as a screw driver) or the like.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
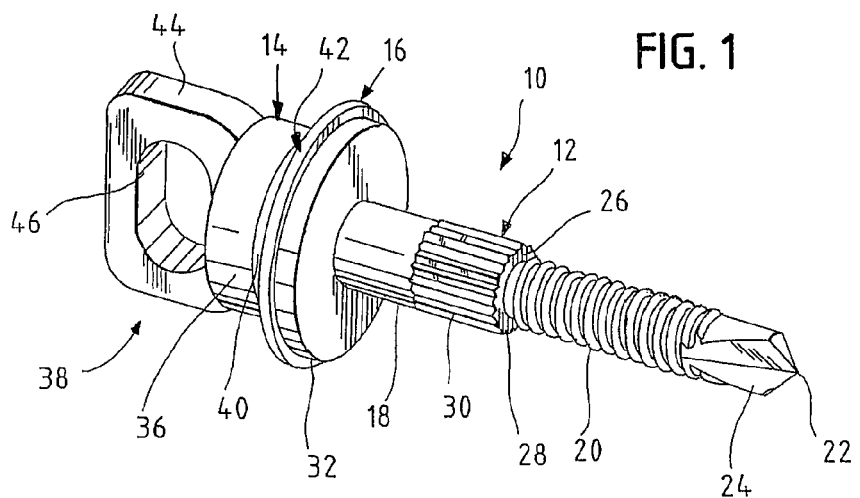
FIG. 1 is a perspective view of a brick tie anchor embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1 there is shown a brick tie anchor 10 embodying the principles of the present invention. The anchor 10 includes a shank 12 and a head 14. A washer 16 separate the shank 12 and head 14. The shank 12 has an upper portion 18 and a threaded lower portion 20 terminating at a self-drilling or self-tapping penetrating tip 22, that can include a recess 24 in the tip 22. A shoulder 26 is present at the end of the shank upper portion 18 at a transition 28 to the shank threaded portion 20. In a present anchor 10, the threaded portion 20 extends to the shoulder 26. The shank 12 is formed as a fastener having a head 13 (that can be formed having a hexagonal shape) and a lower flange-like portion 15.

The upper shank portion 18 includes a knurled region 30 up to and including the transition 28. The knurled portion 30 can extend a desired distance 130 along the shank 12 toward the washer 16. The knurled portion 30 can extend about the entire periphery of the shank 12. In a present anchor 10, the knurls are formed parallel to a longitudinal axis $A_{10}$ of the anchor 10. The knurling 30 can have an effective outer periphery $p_{30}$ that is equal to or just slightly larger than the outer periphery $p_{18}$ of the upper shank portion 18. The knurled periphery $p_{30}$ may be larger than the non-knurled periphery $p_{18}$ by virtue of the formation of the knurls 30. This, as is discussed below, facilitates easy penetration of the entire shank portion 12 into the wall structure W. Shank portion 18 has a larger diameter $d_{18}$ than the lower shank portion 20 (diameter indicated at $d_{20}$) to prevent overdriving the fastener 10 into the underlying structure W.

The washer 16 separates the head 14 from the shank 12. The washer 16 serves as a flange or stop for the anchor 10 as it is driven into the underlying structure W. The washer 16 further serves to stabilize the anchor 10 in the wall W to prevent lateral movement. A present washer 16 is a sealing washer and includes a rubber or other resilient seal element 32 on the side 34 of the washer 16 that contacts the underlying structure W.

The head 14 includes a shaped body 36 and driving portion 38. In a present embodiment, the body 36 has a generally short cylindrical shape and is tapered inwardly (as indicated at 40) at a juncture 42 with the washer 16 to effect the crimp of the head 14 to the shank 12. The body 36 includes a cavity 37 within which the shank head 13 and flange 15 are received. A present anchor 10 has 12-24 threads.

The driving portion 38 includes an elongated key portion 44 having an opening 46. The key portion 44 has a generally rectangular cross-section (as indicated at 48), and extends outwardly or upwardly from the body 36. In this manner the key portion 44, which is relatively large, is received in a driving tool 102 (see FIGS. 4A and 4B) and is stable in the driving tool 102 during the driving operation. The key portion 44 opening is provide through which a brick tie T is inserted to secure the brick veneer B to the anchor 10.

Figure 1A:
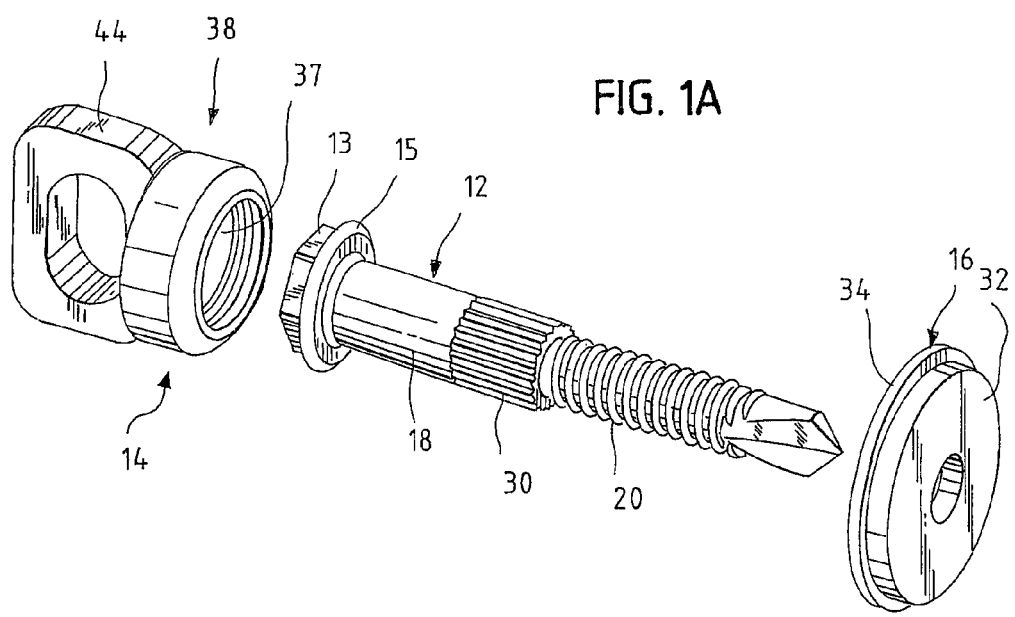
FIG. 1A is an exploded view of the brick tie anchor or FIG. 1.
Figure 2:
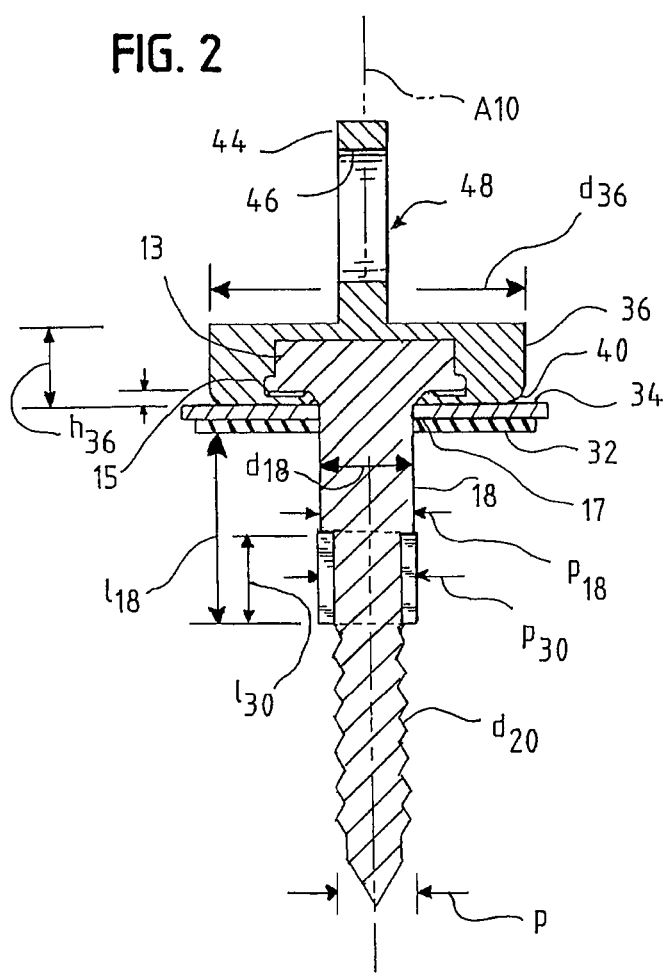
FIG. 2 is a cross-sectional view of the anchor.
Figure 3:
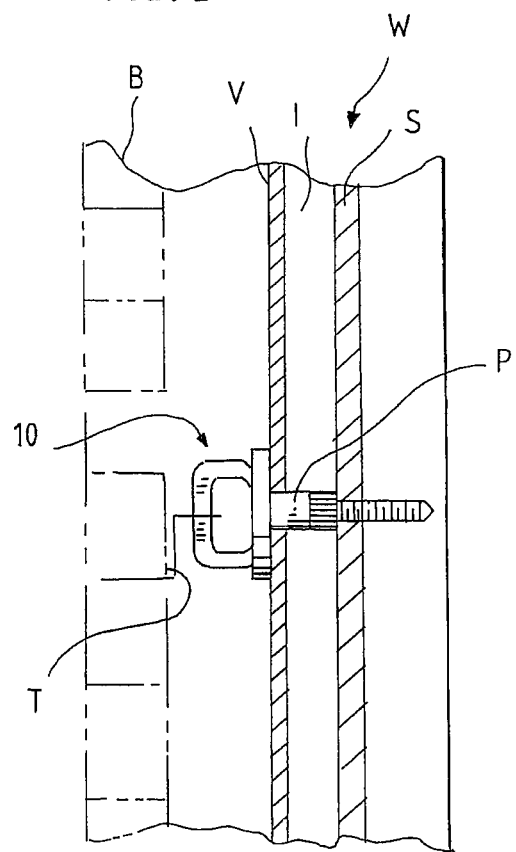
FIG. 3 is an elevational view showing the anchor in use, in an exemplary structure and with a brick veneer over the structure.

In a present anchor 10, the head portion 14 is formed as one piece, preferably from a carbon steel material and is crimped and swaged onto the shank portion 12 (including the self driving threaded portion 20) with the washer 16 between. As will be appreciated from FIGS. 1A and 2, as the head 14 is crimped onto the shank 12, the shank head 13 is forced into the head 14 material and deforms the head 14 material sufficiently so that the shank 12 does not rotate relative to the head 14. Crimping is carried out up to and "under" the flange portion 15 of the head 14 (with the flange portion 15 captured within the crimped region—indicated at 17—of the head 14) so as to fasten the head 14 to the shank 12. Those skilled in the art will recognize the materials from which the shank 12 can be fabricated.

Figure 4A:
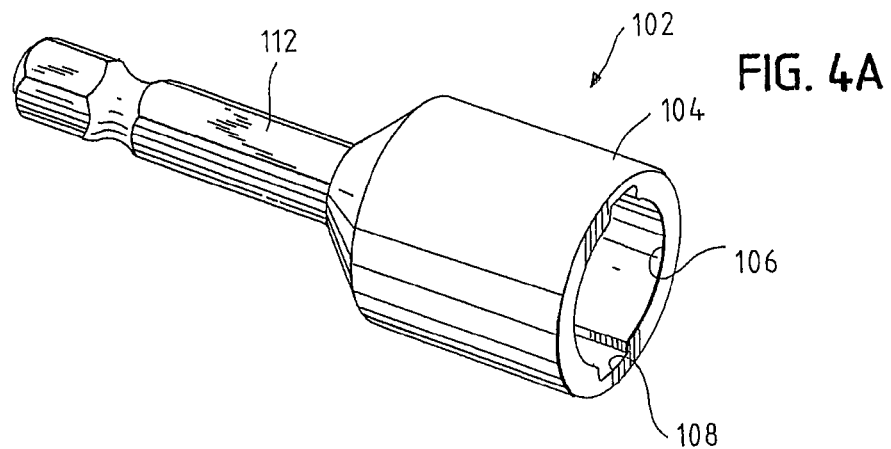
FIGS. 4A and 4B are perspective and cross-sectional views of an embodiment of a tool for installing the present anchor.
Figure 4B:
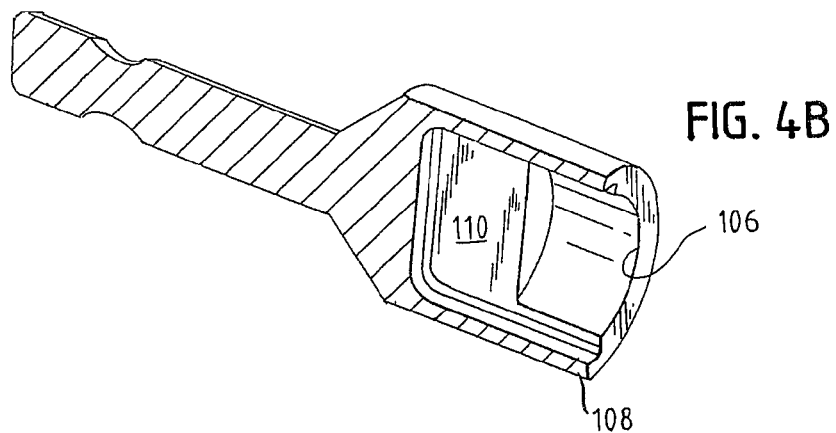

Referring to FIGS. 4A and 4B, one embodiment of a driving tool 102 for the anchor 10 includes a cylindrical body 104 having a cylindrical bore or recess 106 formed therein to receive the head 14 of the anchor 10. A slotted opening 108 (having side flats 110, see FIG. 4B) is formed in the body 104 in the direction of the recess 106. The slot 104 is configured to receive the key portion 44 while the cylindrical recess 106 receives the cylindrical anchor body 36. A present tool 102 is in the form of a socket or like tool having a shank 112 that is readily attached to an electric drill or driving tool chuck or other tool support.

Figure 5A:
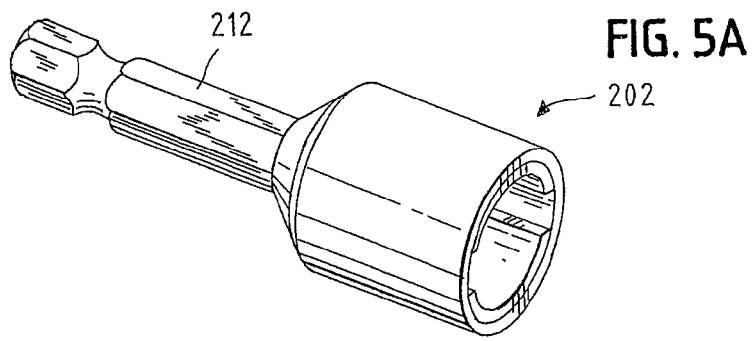
FIGS. 5A and 5B are perspective and exploded views of an alternate embodiment of the tool.
Figure 5B:
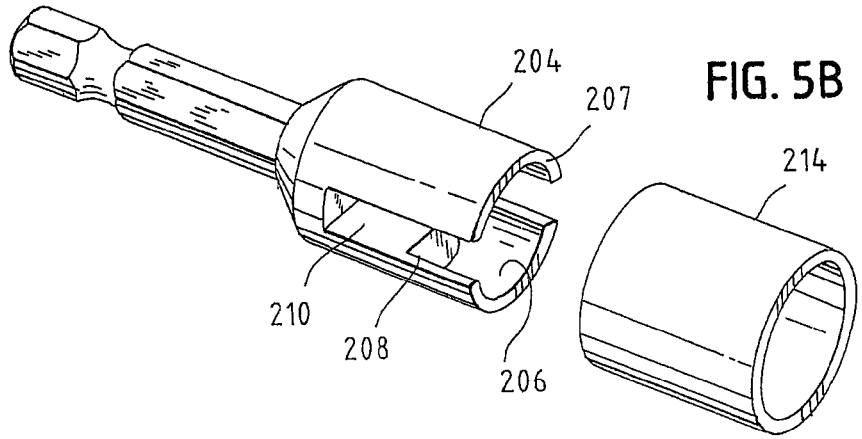

An alternate embodiment of the driving tool 202, illustrated in FIGS. 5A and 5B, is a two-piece tool in which a body portion 204 is formed as a cylinder with a bore or recess 206 extending partially into the body 204 from an end 207 thereof. A pair of slots 208 are formed in the body 204 extending from the end 207 deeper into the body than the recess 206 to define flats 210 (one shown in FIG. 5B). A shank 212 extends from the body 204 that is readily attached to a driving tool chuck.

An outer sleeve 214 is fitted over the body 204 to provide strength to the tool 202. It will be appreciated that two-piece design of the tool 202 makes this tool readily fabricated.

As in the previous embodiment, the slots 208 are configured to receive the key portion 44 while the cylindrical recess 206 receives the cylindrical anchor body 36.

It has been found that the side flats 110, 210 provide points or surfaces of contact for the anchor key portion 44 while the edges of the flats 110, 210 and the cylindrical recess 106, 206 help to align and stabilize the anchor 10 during the driving operation.

As to the anchor 10, it has been found that the knurled shank portion 30 (which, due to the knurling, can be slightly larger than—have a larger periphery than—the non-knurled upper shank portion 18) serves to ream a hole in the insulation I and the gypsum G to permit the upper shank portion 18 to penetrate the insulation I and gypsum G more readily and without interference. It has also been found that the seal (rubber) portion 32 of the washer 16 serves to provide a moisture barrier at the penetration P through the vapor barrier V, thus reducing the opportunity for moisture ingress at the penetration P. It has also been found that the washer 16 itself provides stability for the anchor 10 by providing an enlarged area over which the anchor 10 rests against the structure W and prevents lateral movement and rotation of the anchor 10 as it is installed in the underlying structural members S.

It will be appreciated that although the present anchor 10 is disclosed and presented for attachment to light gauge steel structures, the anchor 10 can be adapted for use with underlying heavy gauge steel structure by incorporating a drill screw into the threaded fastener portion, with underlying masonry by incorporating a masonry anchor threaded fastener portion, and the like. All such adaptations for use in these other underlying structures are within the scope and spirit of the present application.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A brick tie anchor for securing a brick veneer to an underlying structure, and a driving tool combination comprising:

a brick-tie anchor including a fastener head portion having a cylindrical shaped body including a cavity defining a longitudinal axis and a driving portion, the driving portion including a key portion extending from an end of the body, the key portion having a generally rectangular cross-section with flat sides and having an opening through a substantially central mid portion of said flat sides;

a shank, the shank physically distinct from the fastener head portion and having an upper shank portion and a lower shank portion, the lower shank portion being threaded for penetration into the underlying structure, the upper shank portion and the lower shank portion being separated from one another by a shoulder, the upper shank portion including a knurled region extending from the shoulder, the knurled region defining an effective peripheral area equal to or greater than a peripheral area of the non-knurled region of the upper shank portion, wherein the shank includes a shank head portion with a flange portion fitted into and secured within the cavity of the shaped body of the fastener head portion by crimping the fastener head portion over the flange;

a washer disposed at a juncture of the fastener head portion and the shank, the washer including a resilient element disposed on the washer on a side of the washer adjacent the shank and having a diameter greater than a largest measurement across the fastener head portion; and a driving tool including a driving body and a drive mount for attaching the driving tool to a driver, the body having a cylindrical recess therein and a slotted opening therein contiguous with the recess, the slotted opening defining drive surfaces, the recess configured to receive the anchor shaped body and the slotted opening configured to receive the key portion, wherein when the driving tool is rotated, the drive surfaces exert a force against the key portion to drive the anchor.

2. The combination in accordance with claim 1 wherein the shank head portion deforms an interior portion of the fastener head portion when the fastener head portion is crimped to the shank head portion.

3. The combination in accordance with claim 1 wherein the shank has a penetrating tip at an end thereof.

4. The combination in accordance with claim 3 wherein the penetrating tip is a self-drilling tip.

5. The combination in accordance with claim 1 wherein the knurled region extends about one-half of a length of the upper shank portion.

* * * * *